US005444208A

United States Patent [19]

Mortensen

[11] Patent Number: 5,444,208

[45] Date of Patent: Aug. 22, 1995

[54] MULTIPLE SOURCE PLASMA GENERATION AND INJECTION DEVICE

[75] Inventor: Robert V. Mortensen, Andover, Minn.

[73] Assignee: FMC Corporation, Chicago, Ill.

[21] Appl. No.: 38,309

[22] Filed: Mar. 29, 1993

[51] Int. Cl.[6] .............................................. B23K 10/00

[52] U.S. Cl. .......................... 219/121.48; 219/121.52; 219/121.51; 89/8; 102/202.8; 102/202.9; 102/700

[58] Field of Search ...................... 219/121.52, 121.48, 219/121.5, 121.51; 313/231.31, 231.41; 89/8; 102/472, 700, 202.8, 202.9

[56] References Cited

U.S. PATENT DOCUMENTS 4,352,397 10/1982 Christopher ........................ 106/297
4,535,225 8/1985 Wolf et al. .......................... 219/383
4,948,485 8/1990 Wallsten et al. ................ 219/121.5
5,072,647 12/1991 Goldstein et al. ........................ 89/8
5,171,932 12/1992 McElroy .................................. 89/8
5,225,652 7/1993 Landes .......................... 219/121.47
5,231,242 7/1993 Chryssomallis et al. ................ 89/8
5,287,791 2/1994 Chaboki et al. .......................... 89/8

FOREIGN PATENT DOCUMENTS 0220556 5/1987 European Pat. Off. .
0270520 6/1988 European Pat. Off. .
8602024 4/1986 WIPO .
9003095 3/1990 WIPO .

*Primary Examiner*—Mark H. Paschall
*Attorney, Agent, or Firm*—G. Wolde-Michael; R. C. Kamp; R. Andersen

[57] ABSTRACT

The serial arc plasma injectors device disclosed herein enables the formation of a segmented, isolated chain of plasma arcs which are incubated to form a specified energy level of plasma discharge tailored to initiate ignition and establish efficient combustion in a particular segment of a propellant mass. The device includes a capillary in which a conductive path comprising electrodes is maintained. Particularly, specialized electrodes provide geometric and dimensional flexibility to establish plasma arc and plasma discharge characteristics that are compatible with different zones of the propellant mass. The specialized electrodes in combination with discharge vents enable the development of a series of regions in the capillary through which plasma discharge is introduced into the propellant mass to selectively initiate ignition and promote efficient combustion.

21 Claims, 8 Drawing Sheets

MULTIPLE SOURCE PLASMA GENERATION AND INJECTION DEVICE

FIELD OF THE INVENTION

This invention relates to plasma injection and distribution systems which comprise discrete arc generation devices and more particularly to devices which, in electro-thermal chemical (ETC) gun systems, enable the injection of a compatible amount of plasma energy into segments of a slender combustible or propellant mass to induce efficient combustion.

SUMMARY OF THE INVENTION

The serial arc plasma device of the present invention enables selective initiation of combustion in discrete segments of a propellant mass. Heretofore devices which employ unitary exploding or consumable fuse wires have experienced operational, repeatability and reliability problems when used in slender cartridges containing is propellants. The problem of providing sufficient high energy plasma to initiate ignition and further enhance combustion in a propellant mass is complicated. One of the principal technical difficulties is that the burning of a fuse wire in a capillary is not readily controllable. More particularly, it is not possible to sustain an electric arc in slender wires where the length is greater than 20 times the diameter of a capillary in which a plasma arc is maintained. Thus, this imposes a limitation on the length of fuse wire to be used in plasma gun systems and typically excludes large caliber gun systems which comprise slender propellant cartridges. The serial arc plasma injectors device disclosed herein eliminates these problems and provides several advances and advantages over the prior art by enabling the use of various types of metallic fuse wires as well as different geometries and cross-sections of fuse wires, in combination.

Specific advances, features and advantages of the present invention will become apparent upon examination of the following description and drawings dealing with several specific embodiments thereof.

DESCRIPTION OF THE PREFERRED EMBODIMENTS

The serial arc plasma injector device of the present invention reduces and controls uneven and incomplete burning of a combustible mass where the source of ignition is a high energy plasma arc. Specifically, this disclosure relates to serial arc plasma injectors and devices which can be integrated with or coupled to a propellant containment cartridge. The embodiment of this invention is supplied with each new round of electrothermal-chemical ammunition cartridge. The present invention is distinguished from earlier systems in as much as the serial arc plasma injector enables isolated plasma arc injections at desired energy levels throughout discrete segments of a combustible or propellant mass. Further, the present invention enables the invasion of a propellant mass having linear, circular, helical or any other shape and geometry while maintaining a desired level of plasma discharge throughout the extent of the propellant mass. Thus, the problem of creating a multiplicity of isolated plasma arc injection points, having same or varying energy levels, in a propellant is one of the many important points of this invention as will be discussed herein below.

Figures 1, 2, 3, 4A, 4B, 4C:
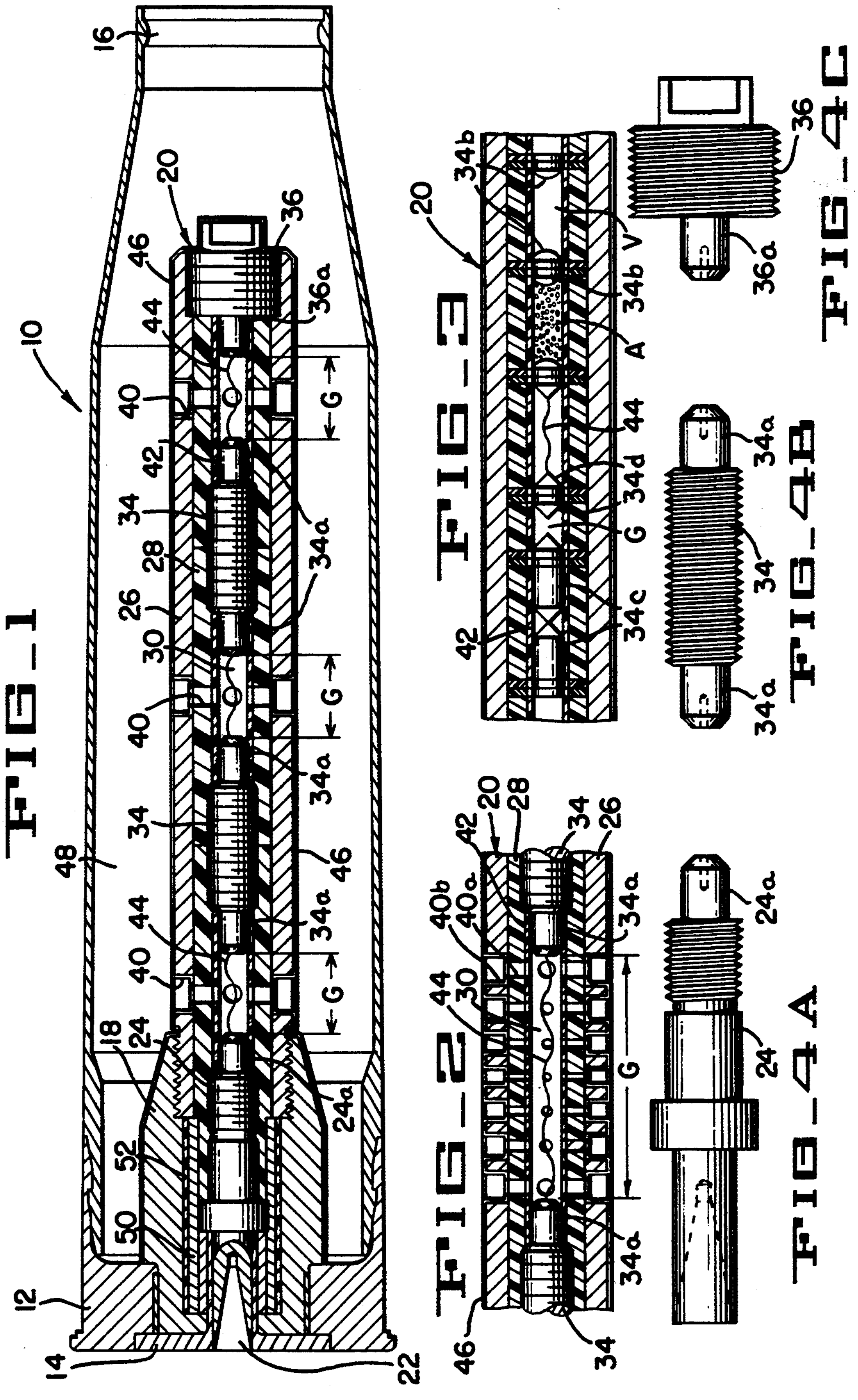
FIG. 1 is a central section of the plasma injection and distribution system of the present invention incorporated in a cartridge.
FIG. 2 is an enlarged view of an arc gap showing vent holes therein.
FIG. 3 is an enlarged view showing geometric and structural variation of intermediate electrodes and arc gaps.
FIG. 4A is an enlarged view showing an anode and a power supply connection therein.
FIG. 4B is an enlarged view of a typical intermediate electrode.
FIG. 4C is an enlarged view of a cathode terminal.

An embodiment of the serial arc plasma injector is shown in FIG. 1. Cartridge housing 10 comprising a stub case 12 and a rim insulator 14 (polyethylene or equivalent) is integrally attached to a projectile 16. Coupling 18 is integrally attached to stub case 12 at one end and threadably connected to capillary 20 on the other end. Capillary 20 is supported at coupling 18 and cantilevers out into cartridge 10. Power supply connection 22 is disposed at the center of rim insulator 14 and provides a direct contact with anode 24. Anode 24 partially extends into capillary 20. Capillary 20 comprises steel housing 26 and dielectric liner 28 (PEEK/S2 Glass or equivalent). Capillary 20 further comprises a central bore 30 in which a plurality of intermediate electrodes 34 are disposed. At the cantilevered end of capillary 20, cathode terminal 36 is threadably inserted into steel housing; 26 and forms a closed end. Anode 24, intermediate electrode 34 and cathode 36 are separated by segments of arc gaps "G". Vent holes 40, forming a specific total area, surround each segment of arc gap "G". Dielectric sleeve 42 (Polyethylene or equivalent) having variable thickness provides support for intermediate electrodes 34 at their shaped ends 34*a* (Refer to FIG. 4 B). Metallic fuse wires 44 connect anode 24 to an intermediate electrode 34. Intermediate electrode 34 is in turn connected to another adjacent intermediate electrode 34 or cathode 36. Membrane cover 46 or dielectric coating is applied to the exterior of capillary 20. Propellant 48 surrounds capillary 20. Coupling 18, in cooperation with alumna (ceramic) tube 50 and structural insulation tube 52, provides support for capillary 20 and connects stub case 12 and rim insulator 14 as well as power supply connection 22.

Turning now to FIG. 2, a detail segment of capillary 20 is shown wherein intermediate electrodes 34 are shown encased in a section of capillary 20. Electrode tips 34*a* extend into dielectric sleeve 42. Vent holes 40 are radially distributed around arc gap "G". Vent holes 40 are of variable diameter as shown. Fuse wire 44 extends is between intermediate electrodes 34.

FIG. 3 depicts a segment of capillary 20 in which different types of materials, geometries and structures of intermediate electrodes 34, gaps "G", dielectric sleeves 42 and fuse wires 44 are used. As will be discussed hereinbelow, the serial arc plasma injector device provides flexibility and adaptability to generate a plasma arc that is compatible with the propellant immediately surrounding a particular segment of capillary 20.

Figure 4D:
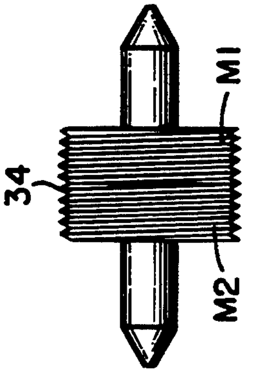
FIG. 4D is an enlarged view of an intermediate electrode made of two types of metals and/or alloys.

FIG. 4A shows anode electrode 24, and tip 24*a*. FIG. 4B shows intermediate electrode, 34 and tips 34*a* with the tips on either side. Intermediate electrode 34 includes a generally cylindrical central segment having a larger diameter than the tip sections. FIG. 4C shows cathode electrode 36 and tip 36*a*. Cathode 36 is configured to include a cap end which forms the closed end for capillary 20. FIG. 4D shows intermediate electrode 34 with segments comprising different types of metallic substances M1 and M2.

Figure 5:
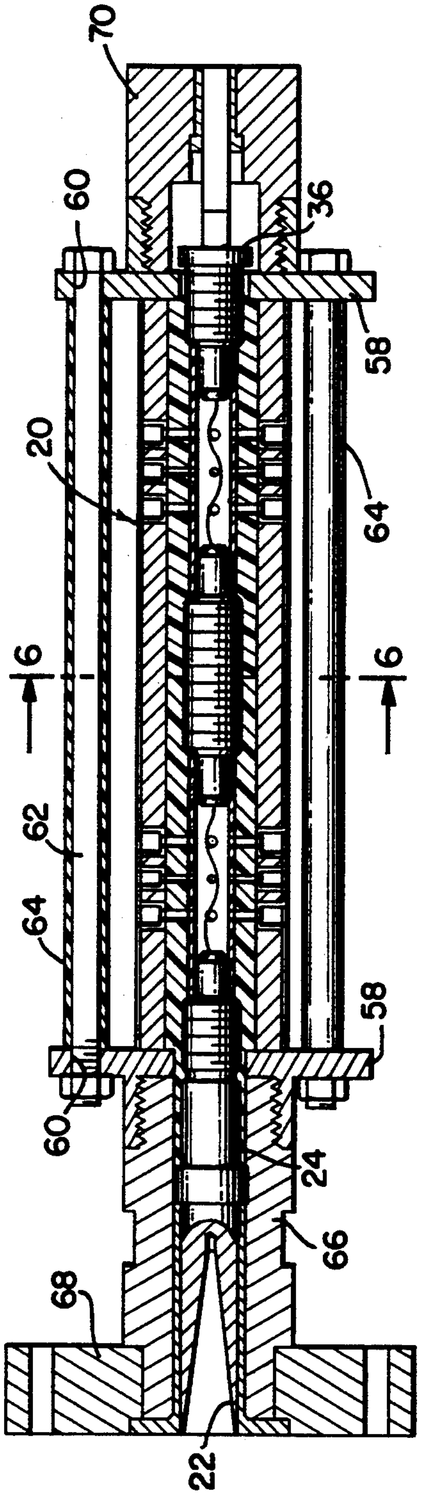
FIG. 5 is a central section of a slender cartridge showing support structure details. The cartridge housing not shown.
Figure 6:
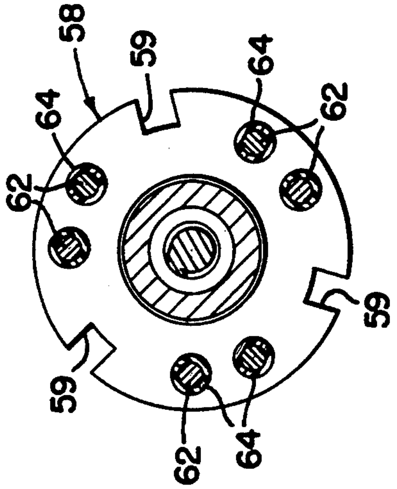
FIG. 6 is a section taken along line 6—6 of FIG. 5.

Referring to FIG. 5 and FIG. 6, an assembly particularly designed to provide structural support for slender cartridges is shown. In the interest of simplicity, the cartridge housing is not shown. The structure comprises a pair of ranged metal sleeves 58 with a series of bolt holes 60. A plurality of steel rods 62 tie ranged metal sleeves 58 together and thereby secure the contents of capillary 20. Steel rods 62 are covered with a dielectric sheath 64. On one end, a connector base 66 is threaded into one of the flanged metal sleeves 58. A base support 68 is integrally connected to connector base 66 as shown. Connector base 66 incorporates power supply connector 22 which is further connected to anode 24. Cap assembly 70 is threaded into a second flanged metal sleeve 58. Cap assembly 70 provides support and connections to cathode 36. Flanged metal sleeve 58 includes notches 59 designed to mate with cartridge housing attachments (not shown).

Figure 7:
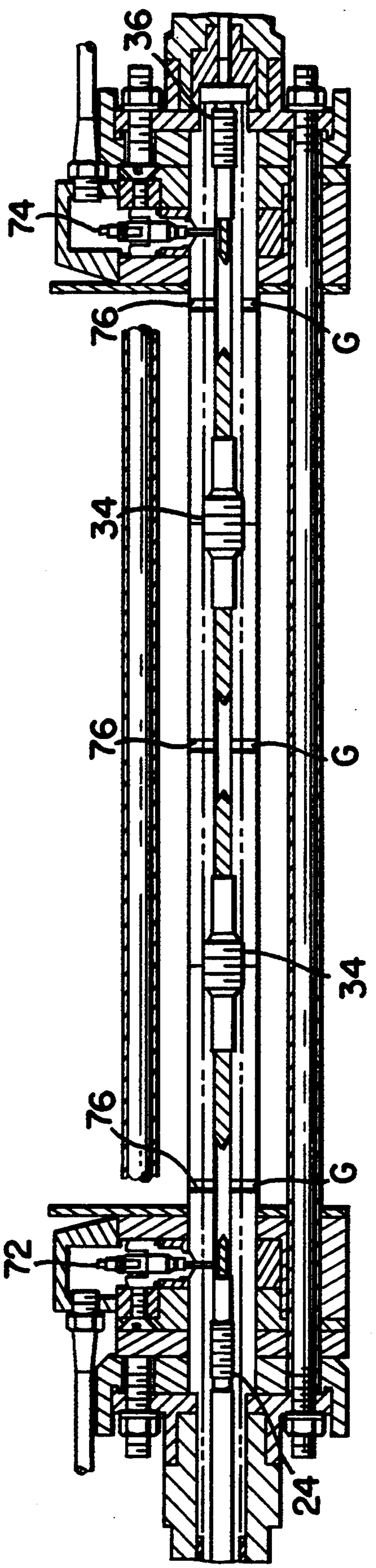
FIG. 7 is a central section of an open air test fixture comprising a slender capillary and support structures. Three arc gaps are shown where test data are collected.
Figure 8:
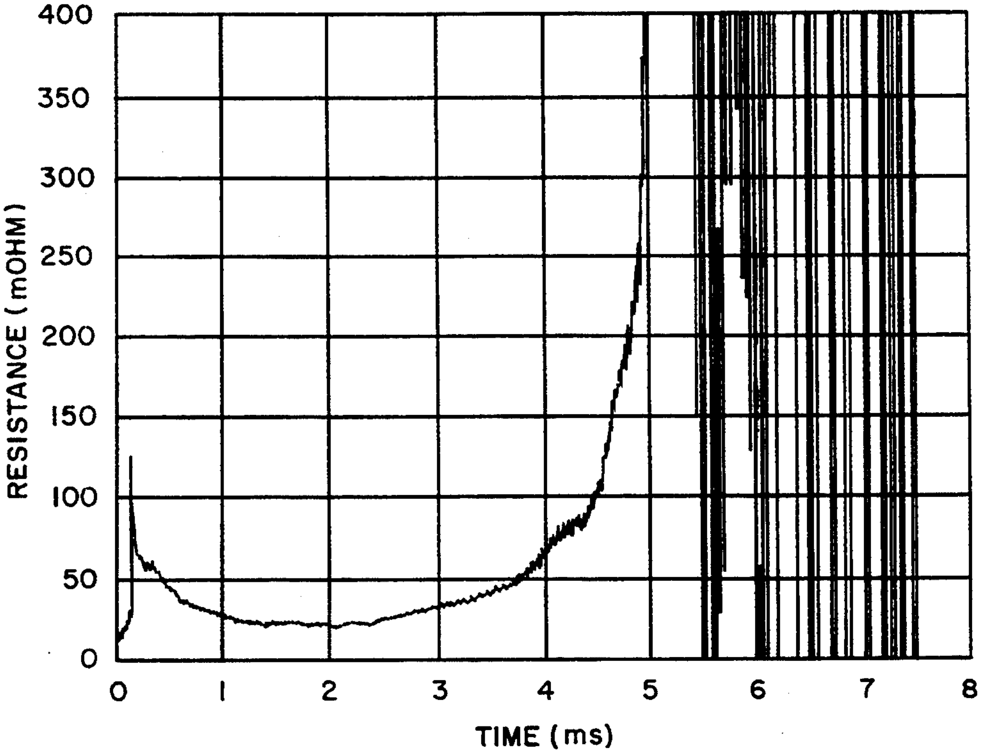
FIG. 8 is a plot showing Resistance in milliohms versus Time in milli-seconds for readings taken at a first arc gap in the open air test fixture.
Figure 9:
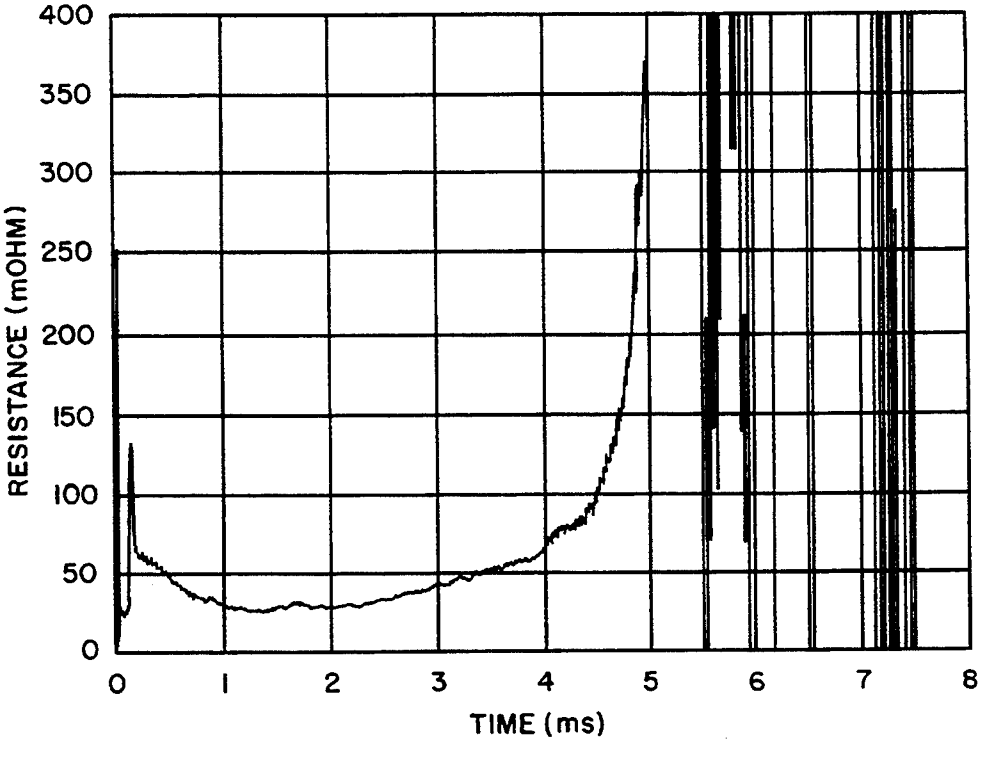
FIG. 9 is a plot showing Resistance in milliohms versus Time in milli-seconds for readings taken at a second arc gap in the open air test fixture.

FIG. 7 shows an open air arc test fixture. Pressure sensors 72 and 74 are located at a first and last arc gaps "G". Central points 76, at arc gaps "G" represent the position at which plasma is emitted and resistance readings taken.

FIGS. 8–14 are graphical representations of operational and performance data obtained using the open air test fixtures. The set of data is discussed hereinbelow to clearly define some of the distinguishing features and advances of the serial arc plasma injection device.

The disclosure hereinabove relates to some of the most important structural features and operational parameters for the serial arc plasma injection device. The operation of the device, under a best mode consideration is described herein below.

Referring to FIG. 1, sufficient power is supplied from a high energy pulse forming network or equivalent power source (Not Shown) at power supply connection 22. Current flows to the anode 24. From anode 24, the current travels to cathode 36 through a conductive path which includes intermediate electrodes 34, electrode tips 34*a* and/or fuse wires 44. Electrode tips 34*a* and/or fuse wires 44 ablate until a series of plasma arcs are formed at arc gaps "G". The plasma ultimately discharges through vent holes 40 to ignite segments of propellant 48 located in the immediate area surrounding vent holes 40. As will be discussed hereinbelow, the structure of the intermediate electrode 34, tips 34*a*, arc gaps "G", vent holes 40 and the overall cooperation of these elements with associated structures provide one of the many unique aspects of the serial arc plasma injector device invention.

Primarily, anode 24 extends partially into capillary 20 forming an extended tip therein. The tip of anode 24 can be shaped to accommodate a particular application requirement, for example, geometric shapes such as cylindrical, conical, frusto-conical or a tapered cone have been used depending upon the type of propellant 48 and the type of fuse wire structure to be used. Anode 24 is connected to fuse wire 44, which is generally metallic. Fuse wire 44 is in turn connected to an intermediate electrode 34. Intermediate electrode 34 provides one of the unique features of the serial arc plasma injector device. The structure of electrode 34 is suited to adopt different types of geometric shapes and metallic substances at electrode tip 34*a*. For example, Referring to FIGS. 3, 4B and 4D, electrode tips 34*a*, 34*b*, 34*c* and 34*d* may be made of aluminum on one side and copper or steel on the other. Similarly, as shown in FIG. 4D, two different types of metals M1 and M2 may be coupled to form an intermediate electrode 34 with symmetric or non-symmetric arrangement of the different metals. Further, different types of alloys may be used as intermediate electrode 34 tailored to be compatible with a specific type of propellant. This flexibility in the structure of the intermediate electrode 34, anode 24 and cathode 36 enable not only variable geometric arrangements of electrodes but also variations in the type of metals to be used at each arc gap "G". Further, depending upon the type of propellant 48, which surrounds the immediate area of arc gap "G", the length, geometric arrangement and type of fuse wire metal to be used may be tailored to provide the most compatible plasma arc for a given power supply and propellant. Particularly, intermediate electrode 34 enables the maintenance of different types of plasma arc injection points throughout the length of capillary 20. The length, and other geometric parameters of intermediate electrode 34 may be tailored to provide variable sizes at different locations along a slender capillary 20. This flexibility enables to generate and inject specific amounts of plasma into a segment of propellant.

FIG. 3 depicts an exemplary arrangement of intermediate electrodes 34 forming a tapered fuse by means of extended tips 34*c*. Yet another arrangement shows intermediate electrodes 34 having conical tips 34*d* with a space therebetween. Another arrangement shows electrode tips 34*d* connected via fuse wire 44. Further, the next arrangement shows synthetic air "A" contained between a pair of button shaped tip electrodes 34*b*. Similarly, the next arrangement shows a vacuum "V" contained between button shaped tip electrodes 34*b*. The arrangement and structure of FIG. 3 depicts that the present invention, particularly intermediate electrode 34, enables to tailor each plasma arc to meet specific requirements. For example, a slender cartridge containing different architecture and compositions of propellants may need variable ignition time and temperatures at different segments. Heretofore, plasma injection devices are not capable to provide precise and segmentally isolated plasma arc throughout a slender propellant mass. Further, it is the experience of the Applicant that intermediate electrode tips 34*a* anode tip 24*a* and cathode tip 36*a* contribute to sustain plasma by slow and controlled ablation, based on specific design geometry and cross sectional area. Thus, intermediate electrodes 34, anode 24, cathode 36 and the associated structures of the present invention are conducive to effect and accommodate variable ablation rate requirements at different segments of a slender propellant. These features enable the generation of a more controllable plasma source compared to thin and singular fuse wires which usually ablate or explode spontaneously.

FIG. 2 depicts the structure of variable size vent holes 40 which are radially distributed at arc gap "G" of capillary 20. Vent holes 40 increase in size, in both directions, from the center of arc gap "G" longitudinally outward. Plasma flow is generally considered hydrodynamic in nature and the arrangement of vent holes 40 enables near uniform discharge of plasma into the surrounding propellant 48. The unique arrangement of Vent holes 40 includes two sets of concentric holes. The first set of vent holes 40*a* are configured having variable diameters and the second set comprise constant diameter vent holes 40*b* on the outside. This structure provides ease of manufacturing while retaining the advantages of the variable size vent holes. Vent holes 40 extend through dielectric sleeve 42, which provides fuel for the plasma by ablation. Dielectric sleeve 42 also provides structural support for the electrode tips by use of variable thickness. In other words, the electrode tips are held in position using different dielectric sleeve 42 thicknesses to accommodate the variable sizes and geometries of the various electrode tips at arc gaps "G". Housing 28 forms a layer over dielectric sleeve 42. Vent holes 40 extend through housing 28. Housing 28 is made of dielectric material and provides fuel for the plasma by ablation. Vent holes 40 are larger at steel housing 26 which forms the top layer of capillary 20. Membrane 46 covers vent holes 40 and steel housing 26. Particularly, membrane 46 is designed to withstand plasma pressure and ruptures only at specified design pressures. Under normal storage conditions, membrane 46 segregates the contents of capillary 20 from propellant 48.

The serial arc plasma injection device operates by using isolated infusion of plasma arc into a propellant mass at strategically located segments. The plasma is injected at arc gap "G" positions. Primarily, with reference to FIG. 1, sufficient energy is supplied to anode 24 via power supply connection. Anode 24 includes a geometrically shaped tip 24*a* which may extend as an electrode into arc gap "G" or in the alternate may be used as a connection for a fuse wire. Similarly, intermediate electrode 34 having geometrically shaped tips 34*a*, extends into arc gap "G" facing anode tip 24*a* with a space therebetween. In the alternate, a metallic fuse wire 44 may be used to connect anode 24 and intermediate electrode 34. Similarly, intermediate electrode 34 is connected via tip 34*a* or fuse wire 44, to another intermediate electrode or cathode 36. Cathode 36 also comprises electrode tip 36*a* which is geometrically shaped to extend into arc gap "G" or provide fuse wire connections. Accordingly, the high power supplied at anode 24 travels through the chain of intermediate electrodes and/or fuse wires to cathode 36. Cathode as 36 provides a conductive path for current to flow into cartridge 10. Further, cartridge 10 transmits the current into the gun tube (Not Shown) where it is grounded.

When the high energy current is supplied via power supply connection 22, electrode tips and/or metallic fuse wires start to heat up in each of the serially oriented arc gaps "G" (Refer to FIGS. 1 and 3). Plasma starts to form and eventually plasma discharges from bore 30 via vent holes 40 into the surrounding propellant. It should be noted that each intermediate electrode 34 comprises a threaded or machined central portion which creates interruptions between adjacent arcs. These interruptions provide a safe space between burning propellant segments such that spontaneous detonation or uncontrolled ignition of propellant 48 is avoided. Moreover, by varying the length of the central portion of intermediate electrode 34, ignition and eventually combustion patterns in segments of a slender propellant can be controlled.

As discussed hereinabove, single fuse wire plasma injection systems have operational and practicability problems when used in slender propellant systems. Particularly, short arcing of plasma is a common problem in such systems. The embodiment of FIG. 5 is suited for very slender propellant systems which are susceptible to arcing problems. Steel bolt 62 provides structural integrity to the assembly. Further, dielectric sheath 64 provides insulation and prevents short arcing and shot-circuiting of plasma. The open air test fixture depicted in FIG. 7 shows a similar arrangement as in FIG. 5.

Figure 14:
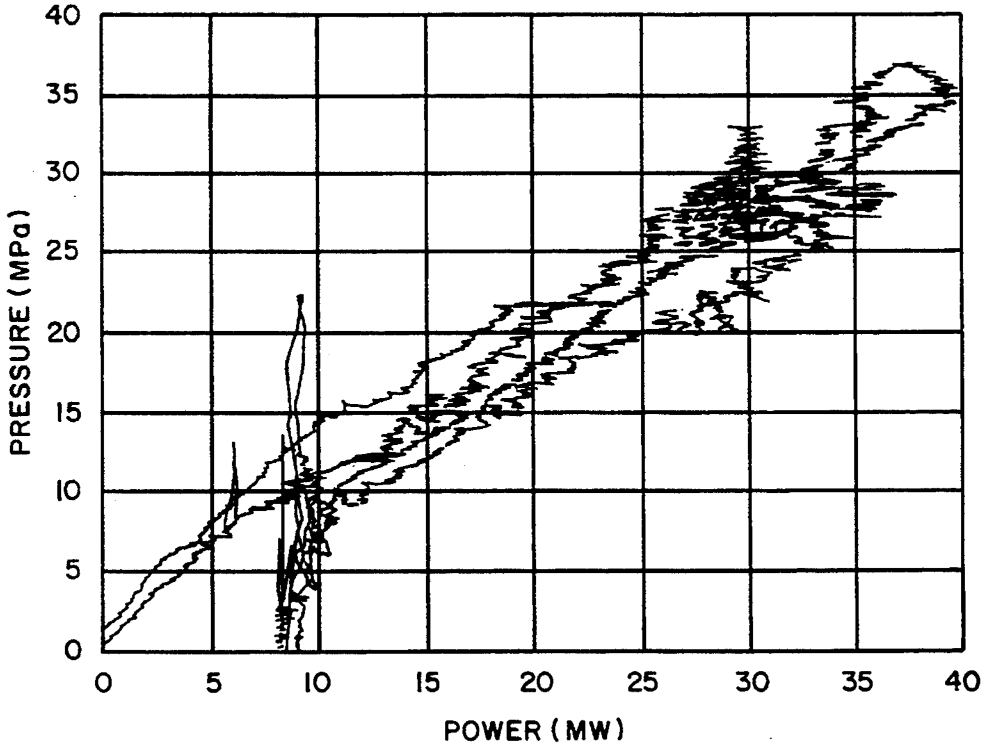
FIG. 14 is a plot of two Pressure versus Power readings taken for readings taken using the open air test fixture.
Figure 10:
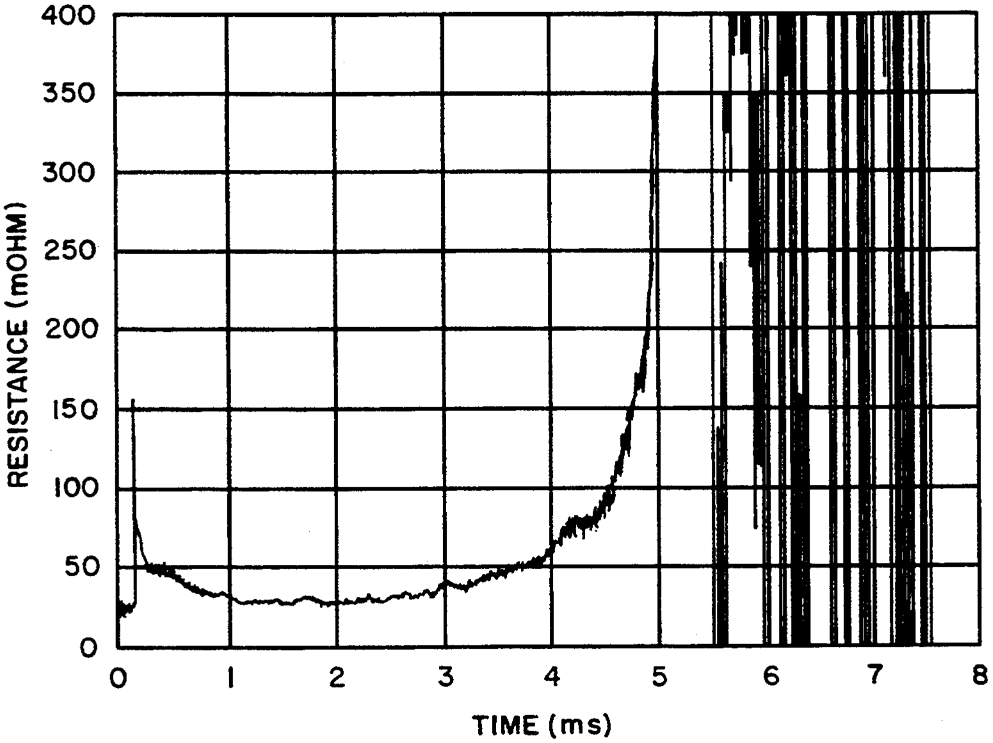
FIG. 10 is a plot showing Resistance in milliohms versus Time in milli-seconds for readings taken at a third arc gap in the open air test fixture.
Figure 11:
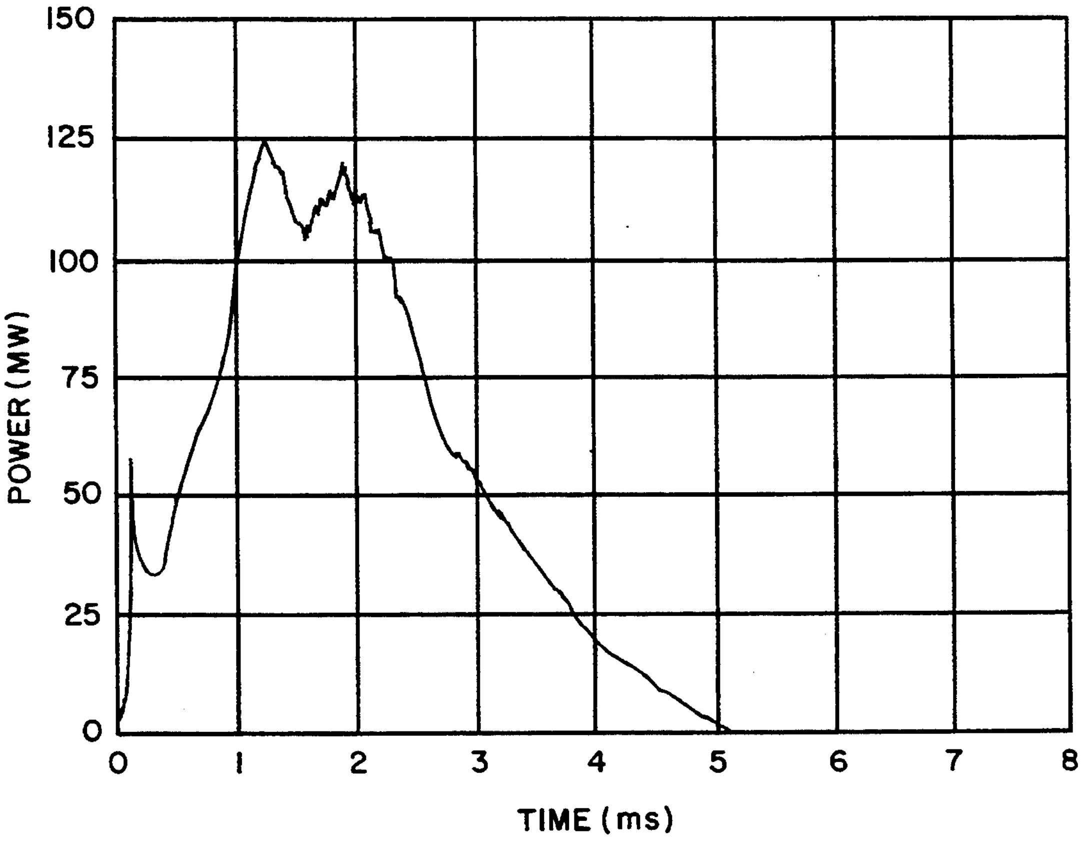
FIG. 11 is a plot of Power in mega watts and Time in milliseconds for readings taken using the open air test fixture.
Figure 12:
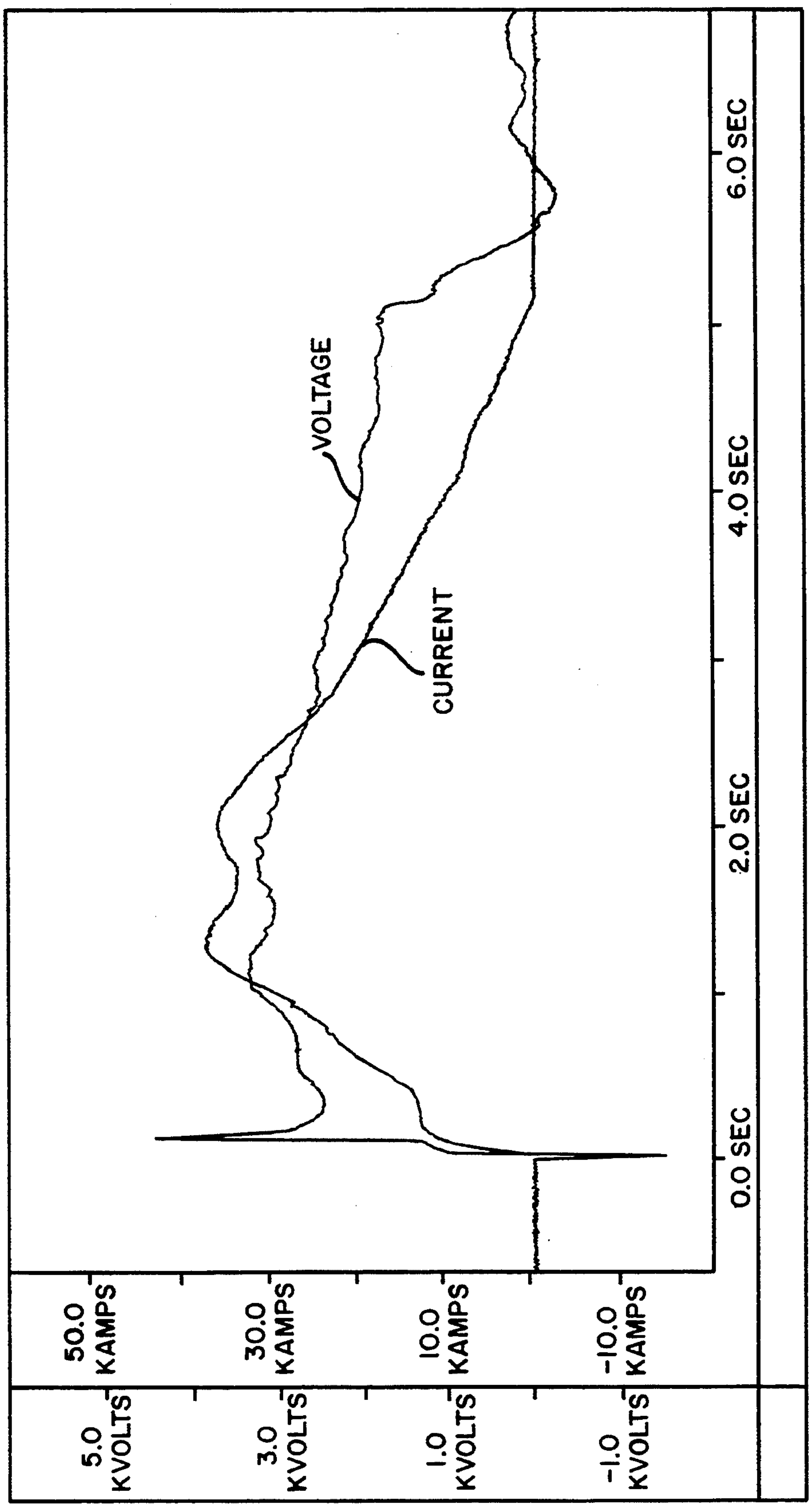
FIG. 12 is a plot showing Voltage in Kilovolts and Current in Kiloamps versus time in milliseconds.
Figure 13:
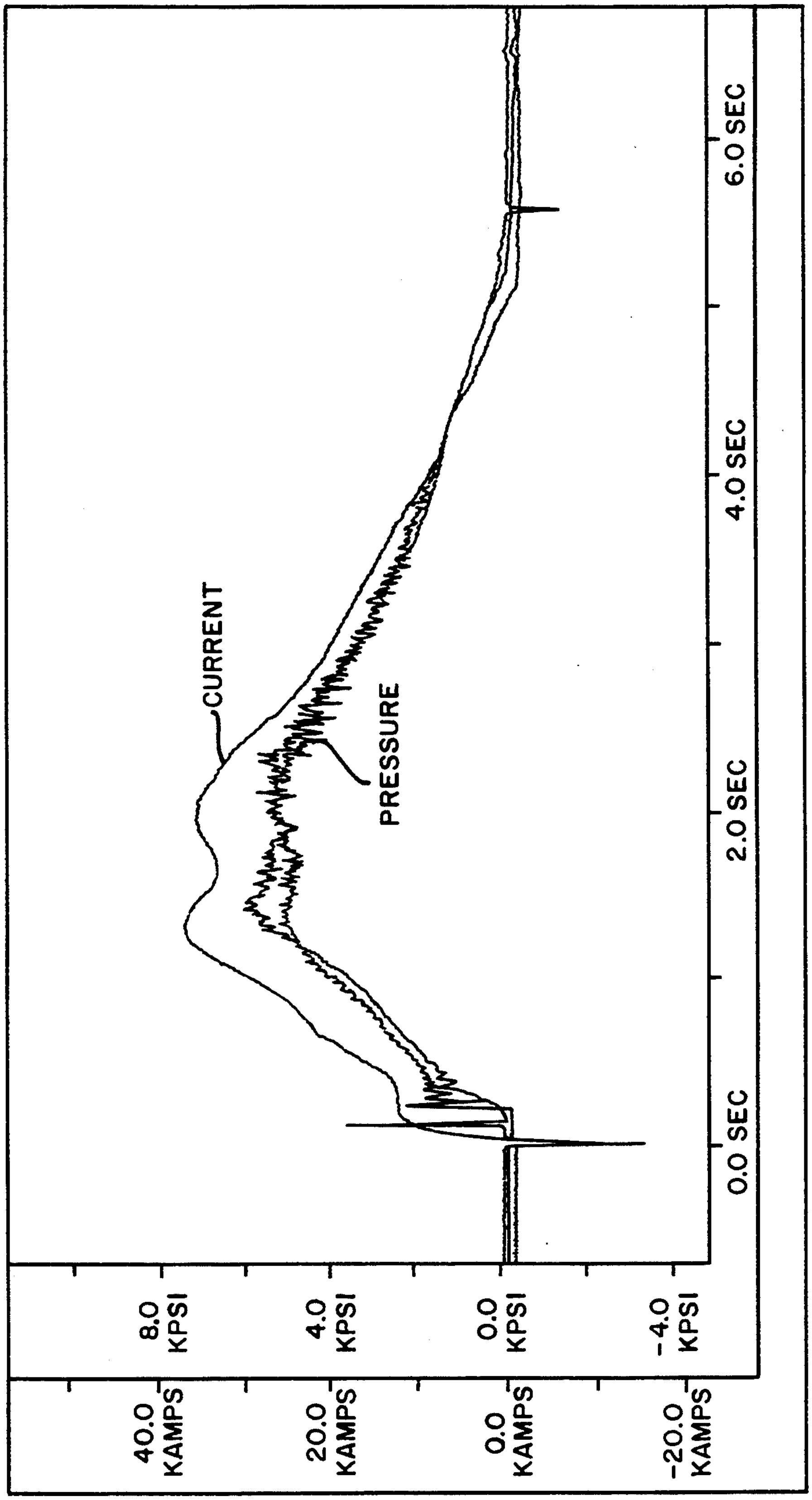
FIG. 13 is a plot of current in Kiloamps and Pressure in Kips per square inch versus time in milliseconds.

The operational and performance parameters for the plasma arc injectors are recorded using the open air test fixture of FIG. 7. FIGS. 8–14 are graphical representations of some of the most important parameters. Primarily, the test is focused on measuring plasma distribution at various arc gaps "G" of capillary 20. The readings are taken at segments 76 which correlate to centers of arc gaps "G". The resistance readings at segments 76 show significant similarities, both in magnitude and profile (Refer to FIGS. 8, 9 and 10). Initially, at about 0.2 milli seconds, a spike develops revealing that the initial flow of current through the electrode is small, thus resulting in higher resistance,, readings. However, after about 0.3 milli seconds, the resistance is reduced substantially and follows a near constant linear path showing the establishment of a stable flow of current. After 4 milliseconds, the resistance increases substantially showing instability in the plasma arc and deterioration of the arc. Beyond 5 milliseconds, the readings become erratic after which event the plasma arc becomes extinguished. FIG. 11 shows that the Power (Mega Watts) increases as the resistance reaches a near constant level. This means that both the current and voltage are increasing and the power reaches its highest peak between the time interval of 1.5 and 2.0 milliseconds. Accordingly, the power curve decreases as the resistance rises. FIG. 12 provides a comparison between the Voltage (Kilo Volts) and the current (Kilo Amps). Both the voltage and the current rise thus accounting for the rise in power during the same time interval, i.e. 1.5–2.0 milli seconds. After about 2.00 milliseconds, the current decreases at a faster rate than the voltage thus confirming the high resistance observed for this time period (Refer. to FIGS. 8–11). The current (Kilo Amps)

is also compared to pressure (Kips per square inch) across the capillary 20 (Refer to FIG. 13). The plot shows that there is a direct relationship between current and pressure. Both the current and pressure follow a similar pattern of initial rise and subsequent decrease in magnitude. FIG. 14 shows a plot for two readings of Pressure (Million Pounds per square inch) versus Power (Mega watts) in a single test. The curves show a general linear relationship between Pressure and Power. This result implies that knowledge of one will enable the prediction of the other. In other words, the serial arc plasma injection device disclosed herein enables a near precise prediction of either power or pressure when one of them is known. It is noteworthy that power and pressure are some of the most significant performance and design parameters in electrothermal-chemical gun systems. It is also noteworthy that the serial arc plasma injector device of the present invention enables the predictability of these and other parameters by creating uniform distribution of plasma throughout the extent of a slender propellant mass.

Accordingly, the serial arc plasma injection device disclosed herein enables formation of reliable plasma arcs tailored to ignite and promote efficient combustion of specific segments of a slender propellant mass. Heretofore, plasma injection systems use exploding wires and electrodes to create a single continuous plasma arc source over a length of a propellant. Further, prior practice in this art is limited to the use of a continuous fuse wire which is centrally disposed parallel to a longitudinal axis of a cartridge. The serial arc injector device disclosed herein enables not only linearly arranged serial arc plasma injection but could also be used with cartridges having helical, circular, staggered, non-linear and randomly oriented propellant mass. Further, unlike single and continuous fuse wires, there is no need of a longitudinally structured cartridge. The intermediate electrodes of the serial arc injectors could be configured is to follow both linear or non-linear path to allow the injection of plasma in any propellant mass containment region. Accordingly, the intermediate electrodes and associated structures of the present invention are especially suited to create discrete plasma arc stations along a desired path within a propellant mass. Particularly, the present invention provides a significant advance in the art where the propellant is not only slender but also comprises different types of combustible chemicals which need various energy levels to ignite. The present invention enables the strategic injection of a measurable amount of plasma into several segments of a slender propellant. Intermediate electrode 34 may be designed to include various types of tip geometries, tip length and different types of metals at either tips 34*a*. Further, as mentioned hereinabove, the central portion of intermediate electrode 34 may be varied to control ignition and combustion fronts within the surrounding slender propellant mass.

Moreover, the present invention enables the control of ignition and combustion patterns within a slender propellant. The device of this invention enables the creation of consistent, reliable, controllable, multiple and isolated plasma arcs which are discretely tailored to meet the combustion needs of various segments in a propellant mass. Particularly, the present invention enables a segmental and isolated invention of a propellant mass with plasma without the attendant problems which include, inter alia, arc extinguishment, arc short circuiting, limited ignition, erratic ignition, non-uniform combustion of propellant and detrimental or premature detonation. More particularly, non-uniform combustion generates pressure peaks and fluctuations which undermine the efficiency of a gun system. Uneven burning of a propellant mass creates high peak pressure waves which limit the type, geometry and arrangement of a propellant that can be used in a gun. Uncontrolled pressure peaks create significant thermal and kinetic stresses on a gun system, thus dictating heavy hardware design to overcome the stresses, and also reduce propellant energy yield due to degradation of the pressure-time curve. The present invention overcomes all these limitations and problems. It provides a segmented, isolated chain of plasma arcs which are incubated to form a specified energy level of plasma discharge tailored to initiate ignition and establish efficient combustion in a particular segment of the propellant mass.

While a preferred embodiment of the serial arc plasma injection device has been shown and described, it will be appreciated that various changes and modifications may be made therein without departing from the spirit of the invention as defined by the scope of the appended claims.

What is claimed is:

1. A multiple source plasma generation and injection device integrated with a cartridge for a projectile containing a combustible mass and further having a power connection to supply sufficient power to the cartridge in order to accelerate the projectile comprising:

a structure to incubate plasma including a capillary formed from a wall of layers of metallic and dielectric substances having first and second ends and further having an internal volume defined by a central bore therein;

at least one intermediate electrode disposed in said bore to form a region of one of said multiple source for plasma between one of an anode and a cathode electrodes disposed at said first and second ends;

means to confine plasma discharge defined by a space within said capillary and said region; and means for guiding said plasma from said region to flow to selectively located positions to initiate ignition and combustion in discrete zones of the combustible mass.

2. The device according to claim 1 wherein said anode electrode includes a contact end for power supply connections, a middle segment and a tip end, disposed at said first end of said capillary, and extends into said bore forming a closed end therein with said tip end located opposite said intermediate electrode.

3. The device according to claim 1 wherein said cathode electrode includes a cap end, a mid-section and a tip end disposed at said second end of said capillary with said mid-section engaging said metallic layer and said tip end extending into said bore to form a closed end therein with said tip end located opposite said intermediate electrode.

4. The device of claim 1 wherein said means for guiding said plasma includes a series of vent holes surrounding said region.

5. The device of claim 1 wherein said structure to incubate plasma includes said region in said bore of said capillary having non-perforated and perforated segments.

6. A multiple source plasma generation and injection device disposed in a cartridge for a projectile containing a combustible mass and further having a power connection to supply sufficient power to the cartridge in order to accelerate the projectile comprising:

a capillary structure having a wall of layers of metallic and dielectric substances having first and second ends and further having an internal volume defined by a central bore therein;

a conductive path including an anode, a cathode and at least one intermediate electrode located between said anode and said cathode disposed in said bore forming a conductive path through which the sufficient power is supplied to the cartridge to generate said plasma;

said anode, said intermediate electrode and said cathode defining regions in said capillary where said plasma is generated; and a series of vent holes in said capillary through which said plasma is injected outwardly from said regions in said capillary.

7. The device according to claim 6 wherein said anode, said cathode and said intermediate electrode disposed in said bore form segments of non-perforated sections in said capillary.

8. The device according to claim 6 wherein said capillary includes an outer membrane cover designed to rupture under plasma pressure when said plasma is injected outwardly from said regions in said capillary.

9. The device according to claim 6 wherein said anode, said intermediate electrode and said cathode are serially connected by a metallic fuse wire forming said conductive path in said capillary.

10. The device of claim 6 wherein said anode, said cathode and said intermediate electrodes include different tip geometries arranged to establish said conductive path to generate a series of plasma within said regions.

11. The device of claim 6 wherein said regions defined by said anode electrode, said cathode electrode and said intermediate electrodes include geometrically and dimensionally varied tip ends surrounded by a dielectric wall having variable thicknesses to fit around said tips.

12. The device of claim 6 wherein said series of vent holes include variable diameter openings distributed in said regions where said plasma is generated.

13. A multiple source plasma generation and injection device integrated in a cartridge for a projectile containing a combustible mass and further having a power supply connection to supply sufficient power to the cartridge in order to accelerate the projectile comprising:

a capillary structure having means to generate plasma selectively injecting plasma in separate regions of the combustible mass;

a conductive path including an anode, at least one intermediate electrode made of two types of metals joined to form two different types of conductors, and a cathode through which sufficient power is supplied to the cartridge to generate said plasma;

said anode electrode, said intermediate electrode and said cathode defining regions where said plasma is formed in said capillary; and a series of vent holes in said capillary through which said plasma is injected into different zones of the combustible mass.

14. The device according to claim 13 wherein said electrodes include geometric tips separated by a synthetic air medium.

15. The device according to claim 13 wherein said electrodes include geometric tips separated by a vacuum space.

16. A multiple source plasma generation and injection device integrated with a cartridge for a projectile containing a combustible mass and further having a power connection to a single power supply providing sufficient power to the cartridge in order to accelerate the projectile comprising:

means for creating discrete and isolated plasma in a capillary having connections to the single power supply;

said capillary having a first end, a mid-section and a second end;

an anode disposed at said first end of said capillary having connections to the single prover supply;

a cathode disposed at said second end of said capillary;

a series of separate intermediate electrodes disposed at said mid-section of said capillary;

said discrete plasma generated between said anode, said intermediate electrodes, and said cathode; and means to incubate said plasma arcs until plasma is injected outwardly from said capillary into the combustible mass.

17. The device of claim 16 wherein said anode, said intermediate electrodes and said cathode form a series of isolated closed segments in said capillary wherein said discrete plasma is generated.

18. A multiple source plasma generation and injection device integrated with a cartridge for a projectile containing a combustible mass and further having a power connection to supply sufficient power to the cartridge in order to accelerate a projectile comprising:

a capillary structure formed from a wall of layers of metallic and dielectric substances having first and second ends and a mid-section, further having an internal volume defined by a central bore therein;

an anode disposed at said first end having connections to the power supply;

a cathode disposed at said second end;

a series of intermediate electrodes disposed in said bore located between said anode and said cathode electrodes and in communications therewith;

plasma regions formed between said anode and said intermediate electrodes and between said cathode and said intermediate electrode, and between said series of intermediate electrodes;

means for incubating plasma in said plasma regions to thereby establish plasma generation and injection into the combustible mass; and means for guiding said plasma to flow into selectively located positions to initiate ignition and enhance combustion in discrete zones of the combustible mass.

19. The device of claim 18 wherein said bore comprises variable size diameter holes intermittently distributed along the inner layer of said capillary.

20. The device of claim 18 wherein said bore comprises uniform size diameter holes intermittently distributed along the outer layer of said capillary.

21. The device of claim 18 wherein said anode includes a threaded portion, a shaped tip portion and a power contact end with said tip portion having geometric shapes to cooperate with an adjacent intermediate electrode and said tip extends into said bore forming a closed end therein.

* * * * *